(12) United States Patent
Candelore et al.

(10) Patent No.: US 11,196,899 B1
(45) Date of Patent: Dec. 7, 2021

(54) SYNCHRONIZATION OF WIRELESS-AUDIO TO VIDEO

(71) Applicant: SONY GROUP CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/905,166

(22) Filed: Jun. 18, 2020

(51) Int. Cl.
*H04N 5/932* (2006.01)
*H04N 5/04* (2006.01)
*G11B 27/10* (2006.01)
*H04W 80/02* (2009.01)

(52) U.S. Cl.
CPC ............. *H04N 5/04* (2013.01); *G11B 27/10* (2013.01); *H04W 80/02* (2013.01)

(58) Field of Classification Search
CPC .......... H04N 5/04; G11B 27/10; H04W 80/02
USPC ....... 386/201, 203, 202, 207, 248, 263, 264, 386/326, 328, 338, 241
See application file for complete search history.

(56) References Cited

U.S. PATENT DOCUMENTS

| | | | |
|---|---|---|---|
| 8,199,780 B2 | 6/2012 | Gha et al. | |
| 9,674,568 B2 | 6/2017 | Du et al. | |
| 10,158,905 B2 | 12/2018 | Lau et al. | |
| 10,892,833 B2* | 1/2021 | Stilwell | H04N 17/004 |
| 2009/0091655 A1 | 4/2009 | Russell | |
| 2010/0142723 A1* | 6/2010 | Bucklen | H04R 3/02 381/81 |
| 2016/0373615 A1 | 12/2016 | Chen | |
| 2018/0077443 A1 | 3/2018 | Lau | |

FOREIGN PATENT DOCUMENTS

CN         204305260 U     4/2015

\* cited by examiner

*Primary Examiner* — Robert Chevalier
(74) *Attorney, Agent, or Firm* — Chip Law Group (57) ABSTRACT

An electronic apparatus and method for synchronization of wireless audio to video is provided. The electronic apparatus determines a first wireless audio processing delay associated with the electronic apparatus and receives media content comprising video content and audio content associated with the video content. The electronic apparatus transmits the audio content to the wireless audio device and controls playback of the video content on the display device based on the determined first wireless audio processing delay such that the playback of the video content is time-synchronized with playback of the audio content on the wireless audio device.

17 Claims, 5 Drawing Sheets

SYNCHRONIZATION OF WIRELESS-AUDIO TO VIDEO

CROSS-REFERENCE TO RELATED APPLICATIONS/INCORPORATION BY REFERENCE

None.

FIELD

Various embodiments of the disclosure relate to audio-to-video (AV) synchronization. More specifically, various embodiments of the disclosure relate to an electronic apparatus and method for synchronization of wireless audio to video.

BACKGROUND

AV synchronization or lip sync issue is a well-known problem associated media transmission and playback. Typically, the lip sync error is measured by an amount of time by which audio of AV content lags behind or leads video of the AV content. In case of wireless audio, such as Bluetooth® audio, there is a noticeable lip sync problem which can be very annoying and can actually make a program unwatchable for certain people.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for synchronization of wireless audio to video is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic apparatus and method for synchronization of wireless audio to video. Exemplary aspects of the disclosure provide an electronic apparatus which may determine a wireless audio processing delay associated with the electronic apparatus (i.e. audio source). The wireless audio processing delay may include a duration by which the playback of the video content may lead or lag behind playback of the audio content on the wireless audio device. The electronic apparatus may transmit the audio content to the wireless audio device for playback and may control the playback of the video content on the display device such that playback of the video content is time-synchronized with the playback of the transmitted audio content on the wireless audio device.

The playback of the video content may be controlled based on the determined wireless audio processing delay. For example, the electronic apparatus may use the determined wireless audio processing delay to delay the playback of the video content on the display device. As the playback of the audio content is delayed due to wireless audio processing, the delayed playback of the video content may be timed to match the delayed playback of the audio content on the wireless audio device. This may mitigate the lip sync (or AV synchronization issue) and enhance the listening experience of the user on the wireless audio device. The user may be able to hear the audio content on the wireless audio device at the same time when the video content is displayed on the display device.

Figure 1:
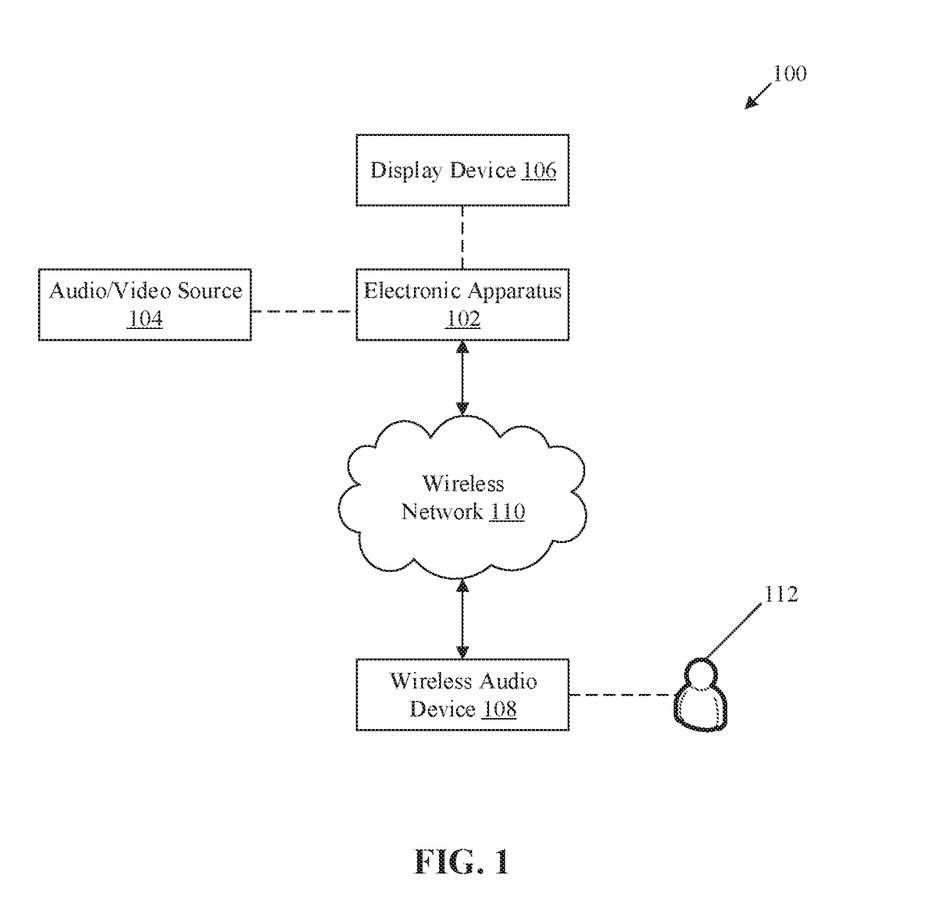
FIG. 1 is a block diagram that illustrates an exemplary network environment for synchronization of wireless audio to video, in accordance with an embodiment of the disclosure.

FIG. 1 is a block diagram that illustrates an exemplary network environment for synchronization of wireless audio to video, in accordance with an embodiment of the disclosure. With reference to FIG. 1, there is shown a network environment 100. The network environment 100 may include an electronic apparatus 102, an audio/video (AV) source 104, a display device 106, and a wireless audio device 108. The electronic apparatus 102 may be coupled to the wireless audio device 108, via a wireless network 110. There is further shown a user 112 who may be associated with the wireless audio device 108. In FIG. 1, the electronic apparatus 102 and the display device 106 are shown as two separate devices, however, in some embodiments, the entire functionality of the display device 106 may be incorporated in the electronic apparatus 102, without a deviation from the scope of the disclosure.

The electronic apparatus 102 may include suitable logic, circuitry, interfaces, and/or code that may be configured to receive media content from the AV source 104 and control playback of the received media content via the display device 106 and one or more audio devices communicatively coupled to the electronic apparatus 102.

In an exemplary embodiment, the electronic apparatus 102 may be a display-enabled media player and the display device 106 may be included in the electronic apparatus 102. Examples of such an implementation of the electronic apparatus 102 may include, but are not limited to, a television (TV), an Internet-Protocol TV (IPTV), a smart TV, a smartphone, a personal computer, a laptop, a tablet, a wearable electronic device, or any other display device with a capability to receive, decode, and play content encapsulated in broadcasting signals from cable or satellite networks, over-the-air broadcast, or internet-based communication signals.

In another exemplary embodiment, the electronic apparatus 102 may be a media player that may communicate with the display device 106, via a wired or a wireless connection. Examples of such an implementation of the electronic apparatus 102 may include, but are not limited to, a digital media player (DMP), a micro-console, a TV tuner, an Advanced Television Systems Committee (ATSC) 3.0 tuner, a set-top-box, an Over-the-Top (OTT) player, a digital media streamer, a media extender/regulator, a digital media hub, a computer workstation, a mainframe computer, a handheld computer, a smart appliance, a plug-in device and/or any other computing device with content streaming and playback functionality.

The AV source 104 may include suitable logic, circuitry, and interfaces that may be configured to transmit the media content to the electronic apparatus 102. The media content on the AV source 104 may include audio content and video content associated with the audio content. For example, if the media content is a television program, then the audio content may include a background audio, actor voice or speech, and other audio components, such as audio description.

In an embodiment, the AV source 104 may be implemented as a storage device which stores the media content. Examples of such an implementation of the AV source 104 may include, but are not limited to, a Pen Drive, a Flash USB Stick, a Hard Disk Drive (HDD), a Solid-State Drive (SSD), and/or a Secure Digital (SD) card. In another embodiment, the AV source 104 may be implemented as a media streaming server, which may transmit the media content to the electronic apparatus 102, via a communication network (not shown). In another embodiment, the AV source 104 may be an TV tuner, such as an ATSC tuner, which may receive digital TV (DTV) signals from an over-the-air broadcast network and may extract the media content from the received DTV signal. Thereafter, the AV source 104 may transmit the extracted media content to the electronic apparatus 102.

In FIG. 1, the AV source 104 and the electronic apparatus 102 are shown as two separate devices. However, the present disclosure may not be so limiting and in some embodiments, the functionality of the AV source 104 may be incorporated in its entirety or at least partially in the electronic apparatus 102, without departing from the scope of the present disclosure.

The display device 106 may include suitable logic, circuitry, and/or interfaces that may be configured to display the video content, which may be received from the electronic apparatus 102. In one embodiment, the display device 106 may be a touch screen which may enable the user 112 to provide a user-input via the display device 106. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 106 may refer to a display screen of a head mounted device (HMD), a smart-glass device, a see-through display, a projection-based display, an electro-chromic display, or a transparent display.

The wireless audio device 108 may include suitable logic, circuitry, and/or interfaces that may be configured to receive the audio content from the electronic apparatus 102. The wireless audio device 108 may be a portable wireless speaker, a wearable audio device, or a head-mounted audio device. Examples of the wireless audio device 108 may include, but are not limited to, a wireless speaker of a surround sound system, an over-head headphone, an in-ear headphone, a clip-on headphone, a bone-conduction headphone, a hearing aid, smart glasses, or a head-mounted display (for example, an Augmented Reality (AR) headset, Mixed Reality (MR) headset, or Virtual Reality (VR) goggles). The wireless audio device 108 may rely on a wireless communication protocol, such as Wi-Fi, Bluetooth®, or Bluetooth® Low Energy (BLE) to receive the audio content from the electronic apparatus 102.

The wireless network 110 may include a medium through which two or more wireless devices may communicate with each other. For example, the wireless network 110 may be established between the electronic apparatus 102 and the wireless audio device 108 and may allow the electronic apparatus 102 and the wireless audio device 108 to communication with each other. In case there are two or more wireless audio devices, each of the two or more wireless audio devices may pair-up and communicate with the electronic apparatus 102 via the wireless network 110.

Examples of wireless network protocols may include, but are not limited to, Radio Frequency Identification (RFID), Wireless USB, and Near Field Communication (NFC) (e.g., NFC Peer-to-Peer), Bluetooth™, or Bluetooth Low Energy (BLE™) ZigBee, Personal Area Network (PAN), Wi-Max, a cellular network, a Long-Term Evolution (LTE) network, or an Evolved High Speed Packet Access (HSPA+), protocols based on 802 wireless standards such as 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11ay, 802.11az, 802.11hr (high data rate), 802.11af (white space spectrum), 802.11-2007, 802.11-2008, 802.11-2012, 802.11-2016.

Figure 2:
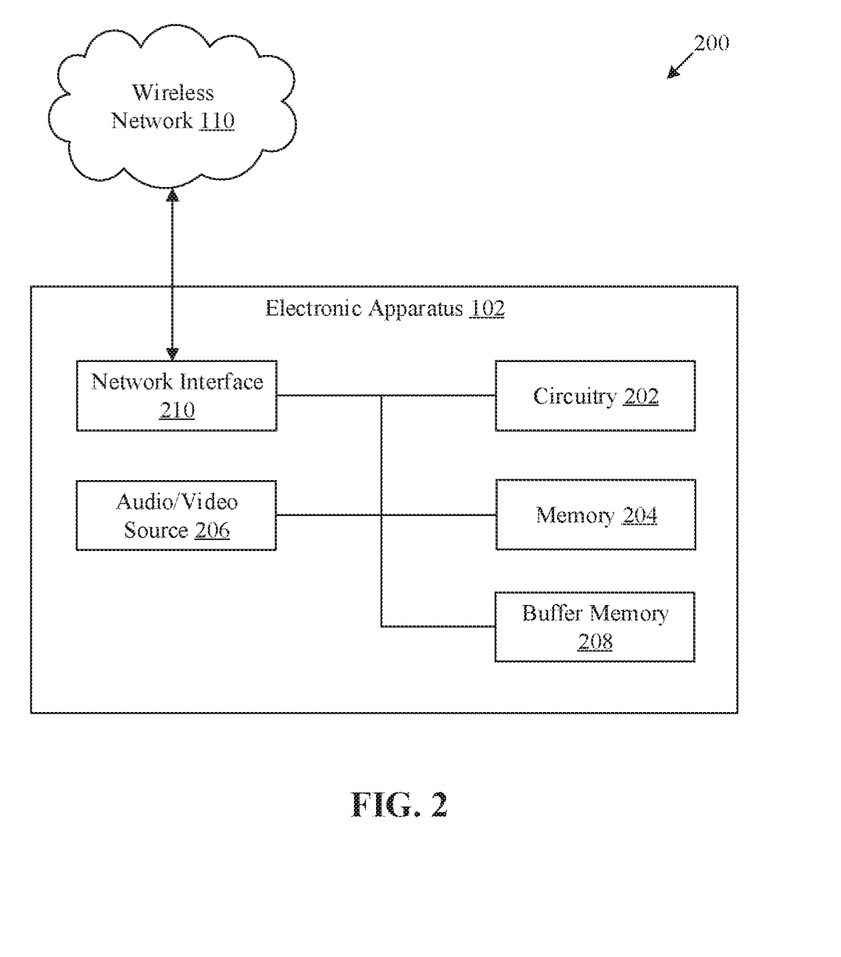
FIG. 2 is a block diagram that illustrates an exemplary electronic apparatus for synchronization of wireless audio to video, in accordance with an embodiment of the disclosure.

In operation, the electronic apparatus 102 may determine the first wireless audio processing delay associated with the electronic apparatus 102. In accordance with an embodiment, the first wireless audio processing delay may be determined based on a first delay profile stored in a memory (as shown in FIG. 2) of the electronic apparatus 102. The memory may store the first delay profile in form of a look-up table, which may include a list of wireless audio processing delays associated with various models or variants (identified by a unique identifier) of the electronic apparatus 102. The look-up table may also include a Media Access Control (MAC) address associated with the electronic apparatus 102. Example of the look-up table is provided in Table 1, as follows:

TABLE 1

| Look-up table | | | |
|---|---|---|---|
| Identifier of Electronic apparatus 102 | Wireless Audio Processing Delay | Buffer Memory (in bytes) | MAC Address |
| Device A | 250 milliseconds | 500K | 00:1A:7D:10:7C:84 |
| Device B | 525 milliseconds | 1050K | F8:DF:15:6D:E9:7B |
| Device C | 300 milliseconds | 600K | 0D:1D:86:88:CC:F0 |

Data provided in Table 1 is merely provided as experimental data and should not be construed as limiting for the present disclosure. The first wireless audio processing delay may be associated an audio processing pipeline of the electronic apparatus 102. The audio processing pipeline may include various audio processing operations which may be executed on the electronic apparatus 102 before the audio content is wirelessly transmitted to the wireless audio device 108. Examples of such audio processing operations may include, but are not limited to, audio frame buffering, sample rate conversions, file format conversions, or audio transcoding.

In some embodiments, the first wireless audio processing delay may depend on a size of each audio buffer and a number of times audio frames of the audio content are stored and retrieved from each audio buffer. A larger audio buffer may introduce a greater latency between the time an audio sample is written into it and read out for next operation. For wireless audio transfer, the audio processing pipeline may also include an operation to convert the audio content into a suitable codec format. For example, if the audio content needs to be transferred as Bluetooth® audio, then the audio content may need to be converted into a suitable codec format to conform with the Bluetooth® standard for audio. Thus, the first wireless audio processing delay may include a latency which may be incurred as a result of the conversion to the suitable codec format for the wireless audio.

The conversion to the suitable codec format may use a suitable audio codec. Examples of an audio codec for Bluetooth® audio may include, but are not limited to, LDAC™, AptX™, AptX™ Adaptive, Low latency and High-Definition audio Codec (LHDC™), Low Complexity Communication Codec (LC3), and low-complexity sub-band codec (SBC). As each type of the audio codec may consume computing resources and buffers in a different manner, the latency included in the first wireless audio processing delay may vary depending on the type of audio codec used for the conversion.

In some other embodiments, the first wireless audio processing delay may also include a latency associated with a wireless audio transfer operation which may be executed by a wireless data transfer hardware or circuitry of the electronic apparatus 102. For example, for Bluetooth® audio transfer, the audio samples of the audio content may be queued, packaged, and sent over the Bluetooth® audio transfer hardware. The Bluetooth audio transfer hardware may packetize and transmit the packetized audio content over the wireless network 110. The latency associated with the Bluetooth® audio transfer may be included in the first wireless audio processing delay. As an example, for Bluetooth® audio, the first wireless audio processing delay may include a 100 milliseconds latency for the audio processing operations of the audio processing pipeline, another 2-5 milliseconds latency for conversion to the suitable codec format, and another 100 milliseconds latency for the Bluetooth® audio transfer.

In some other embodiments, the electronic apparatus 102 may also determine a second wireless audio processing delay associated with the wireless audio device 108. For example, the electronic apparatus 102 may first determine a MAC address of the wireless audio device 108 and then determine the second wireless processing delay associated with the wireless audio device 108 based on the determined MAC address. The second wireless audio processing delay may be determined based on a second delay profile stored in the memory of the electronic apparatus 102. Similar to the first delay profile, the memory may also store the second delay profile in form of a look-up table. The look-up table may include wireless audio processing delays associated with different models or variants of the wireless audio device 108. Example of the look-up table is provided in Table 2, as follows:

TABLE 2

| Look-up table | | |
| --- | --- | --- |
| Identifier of Wireless Audio Device 108 | Wireless Audio Processing Delay | MAC Address |
| Device A | 5 milliseconds | 00:1A:7D:10:7C:84 |
| Device B | 7 milliseconds | F8:DF:15:6D:E9:7B |
| Device C | 10 milliseconds | 0D:1D:86:88:CC:F0 |

Data provided in Table 2 is merely provided as experimental data and should not be construed as limiting for the present disclosure. The second wireless audio processing delay may be associated with a latency caused by audio processing operations on the wireless audio device 108. Examples of such audio processing operations may include, but are not limited to, audio packet/frame buffering, audio decoding or decryption, or other audio effects, such as audio equalization.

In some other embodiments, the electronic apparatus 102 may control the display device 106 to display a test video. Also, the electronic apparatus 102 may transmit a test audio associated with the test video to the wireless audio device 108. The electronic apparatus 102 may receive, via the wireless audio device 108, a user input which may include a duration by which the playback of the test video is to be delayed to match a time of the playback of the transmitted test audio on the wireless audio device 108. The user input may be received in the form of a touch input, a hand gesture, a head gesture, a voice input, and the like. The electronic apparatus 102 may determine the first wireless audio processing delay as the duration included in the user input.

At any time-instant, the electronic apparatus 102 may receive the media content from the AV source 104. The media content may include, for example, audio content, video content associated with the audio content, and other information, such as subtitles and closed captions. The electronic apparatus 102 may transmit the audio content to the wireless audio device 108 via the wireless network 110. Thereafter, the electronic apparatus 102 may control the playback of the video content on the display device 106 based on the determined first wireless audio processing delay such that the playback of the video content is time-synchronized with playback of the audio content on the wireless audio device 108. For example, the playback of the video content may be delayed by at least the determined first wireless audio processing delay to match a time of the playback of the audio content on the wireless audio device 108.

In some embodiments, the electronic apparatus 102 may control the playback of the video content on the display device 106 further based on the determined second audio processing delay. For example, the playback of the video content may be delayed by a time which may equal the sum of the determined first wireless audio processing delay and the determined second wireless audio processing delay. With the delay in the video playback, the user 112 may be able to listen to the audio content on the wireless audio device 108 and watch the video content on the display device 106 without any noticeable lip sync issue.

FIG. 2 is a block diagram that illustrates an exemplary electronic apparatus for synchronization of wireless audio to video, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an AV source 206, a buffer memory 208, and a network interface 210. The circuitry 202 may be communicatively coupled to the wireless audio device 108, the AV source 206, the buffer memory 208, and the network interface 210. The AV source 206 is an exemplary implementation of the AV source 104 of FIG. 1.

The circuitry 202 may include suitable logic, circuitry, and/or interfaces that may be configured to execute program instructions associated with different operations to be executed by the electronic apparatus 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store program instructions to be executed by the circuitry 202. In at least one embodiment, the memory 204 may be configured to store the first delay profile for the electronic apparatus 102. The first delay profile may include the first wireless audio processing delay associated with the electronic apparatus 102. Additionally, the first delay profile may include a model name or an identifier (ID) of the electronic apparatus 102 and/or a Media Access Control (MAC) address associated with the electronic apparatus 102. The memory 204 may be also configured to store the second delay profile for the wireless audio device 108. The second delay profile may include a second wireless audio processing delay associated with the wireless audio device 108. Additionally, the second delay profile may include a model name or an identifier of the wireless audio device 108 and/or a MAC address associated with the wireless audio device 108. The memory 204 may be further configured to store the media content including the video content and the audio content associated with the video content. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The AV source 206 may include suitable logic, circuitry, and/or interfaces that may be configured to output compressed media which includes compressed audio data and compressed video data. The AV source 206 may further include a memory for storage of the compressed media. The AV source 206 may receive the compressed media through various content delivery systems, such as terrestrial content broadcasting networks, satellite-based broadcasting networks, Internet Protocol (IP) based content networks, or a combination thereof.

The buffer memory 208 may include suitable logic, circuitry, and interfaces that may be configured to temporarily store data to be transmitted to or received from the electronic apparatus 102. In one embodiment, the memory 204 may be configured to instantaneously allocate the buffer memory 208 when the data is required to stored. The size of the allocation (in Kilobytes or Megabytes) may depend on a content bandwidth (in Mbps) and whether compressed or uncompressed data is required to be stored in the buffer memory 208. In another embodiment, the buffer memory 208 may be a memory module which may be separate from the memory 204. Example implementations of such a memory module may include, but are not limited to, Random Access Memory (RAM), Read Only Memory (ROM), Electrically Erasable Programmable Read-Only Memory (EEPROM), Hard Disk Drive (HDD), a Solid-State Drive (SSD), and/or a Secure Digital (SD) card.

The network interface 210 may include suitable logic, circuitry, interfaces, and/or code that may be configured to facilitate communication between the circuitry 202 and the wireless audio device 108, via the wireless network 110. The network interface 210 may be implemented by use of various known technologies to support wireless communication of the electronic apparatus 102 via the wireless network 110. The network interface 210 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like.

The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), or Worldwide Interoperability for Microwave Access (Wi-MAX).

The functions or operations executed by the electronic apparatus 102, as described in FIG. 1, may be performed by the circuitry 202. Operations executed by the circuitry 202 are described in detail, for example, in FIG. 3 and FIG. 4.

Figure 3:
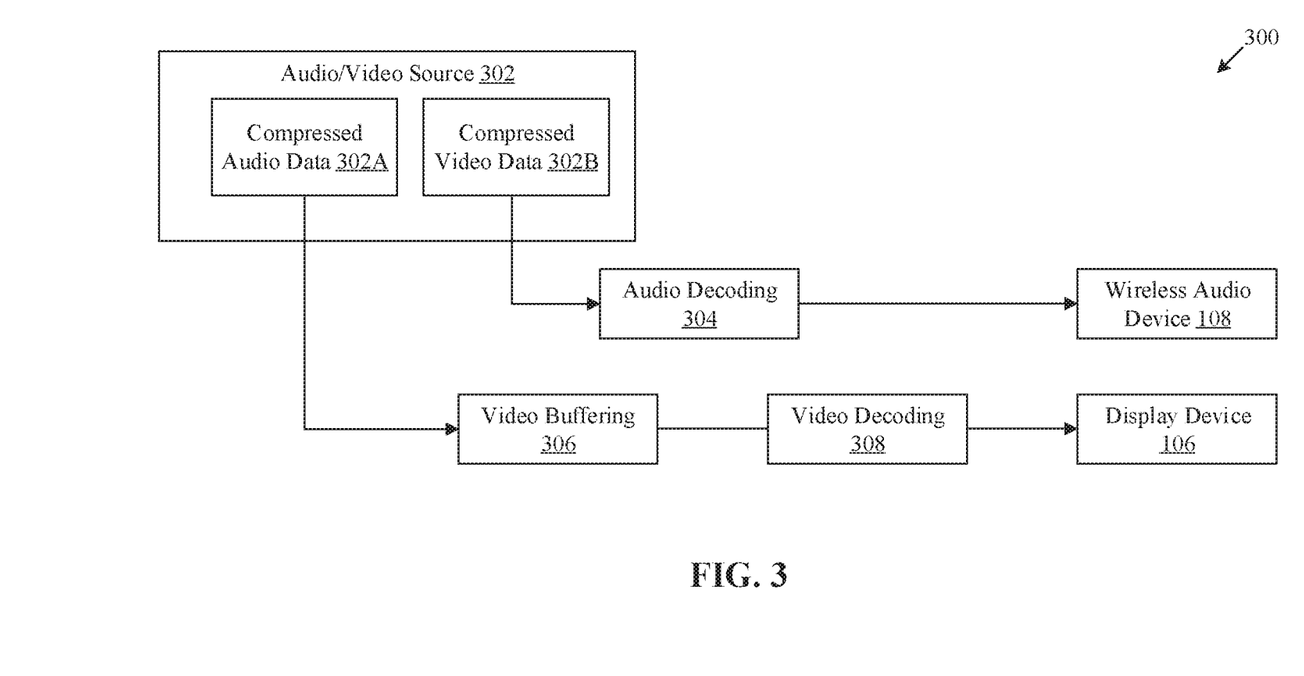
FIG. 3 is a diagram that illustrates exemplary operations for synchronization of wireless audio to video, in accordance with an embodiment of the disclosure.

FIG. 3 is a diagram that illustrates exemplary operations for synchronization of wireless audio to video, in accordance with an embodiment of the disclosure. FIG. 3 is explained in conjunction with elements from FIG. 1 and FIG. 2. With reference to FIG. 3, there is shown a block diagram 300 that illustrates exemplary operations from 304 to 308 for synchronization of wireless audio to video. The exemplary operations may be executed by any computing system, for example, by the electronic apparatus 102 of FIG. 1 or by the circuitry 202 of FIG. 2.

There is further shown an AV source 302 which may be coupled to the buffer memory 208 of FIG. 2. The AV source 302 is an exemplary implementation of the AV source 206 of FIG. 2 or the AV source 104 of FIG. 1. The description of the AV source 302 is omitted from the disclosure for the sake of brevity. The AV source 302 may store the compressed media which includes compressed audio data 302A and compressed video data 302B associated with the compressed audio data 302A.

At 304, the compressed audio data 302A may be decoded. In accordance with an embodiment, the circuitry 202 may decode the compressed audio data 302A to output uncompressed audio, which may be referred to as the audio content. The compressed audio data 302A may be decoded and converted to a suitable codec format supported by an audio codec for wireless audio transfer. Thereafter, the circuitry 202 may transmit the audio content to the wireless audio device 108, via the wireless network 110.

The decoding of the compressed audio data 302A, the conversion to the suitable codec format, and the wireless transmission of the audio content may incur a delay in the wireless audio processing pipeline of the electronic apparatus 102. The delay may equal (or may approximate) the determined first wireless audio processing delay (as described in FIG. 1) associated with the electronic apparatus 102. In order to avoid any lip synch error due to such delay in the wireless audio processing pipeline of the electronic apparatus 102, decoding of the compressed video data 302B may be delayed, as described at 306.

At 306, the compressed video data 302B may be stored in the buffer memory 208. In accordance with an embodiment, the circuitry 202 may store the compressed video data 302B in the buffer memory 208 for a holding duration while the compressed audio data 302A is decoded, converted, and transmitted to the wireless audio device 108 (at 304). The holding duration may refer to a time duration for which the compressed video data 302B may be stored in the buffer memory 208 to delay the playback of uncompressed video data (i.e. video content) on the display device 106 and to match a time of the playback of the transmitted audio content to the wireless audio device 108. The holding duration may include the determined first wireless audio processing delay and/or any delay associated with movement of the compressed video data 302B in and out of the buffer memory 208. In at least one embodiment, the holding duration may also include the second wireless audio processing delay (as described in FIG. 1) associated with the wireless audio device 108.

At 308, the compressed video data 302B may be decoded. In accordance with an embodiment, the circuitry 202 may extract the compressed video data 302B from the buffer memory 208 after the holding duration. After the extraction, the circuitry 202 may decode the compressed video data 302B to output uncompressed video, which may be referred to as the video content. After the compressed video data 302B is decoded, the circuitry 202 may transfer the video content to the display device 106 and may control the playback of the video content on the display device 106. As the operations at 308 may start only after with the compressed video data 302B is removed from the buffer memory 208, the playback of the video content may be delayed to match the time of the playback of the audio content on the wireless audio device 108. This may allow the electronic apparatus 102 to remove the lip sync error typically associated with the playback of the video content and the playback of the audio content.

Figure 4:
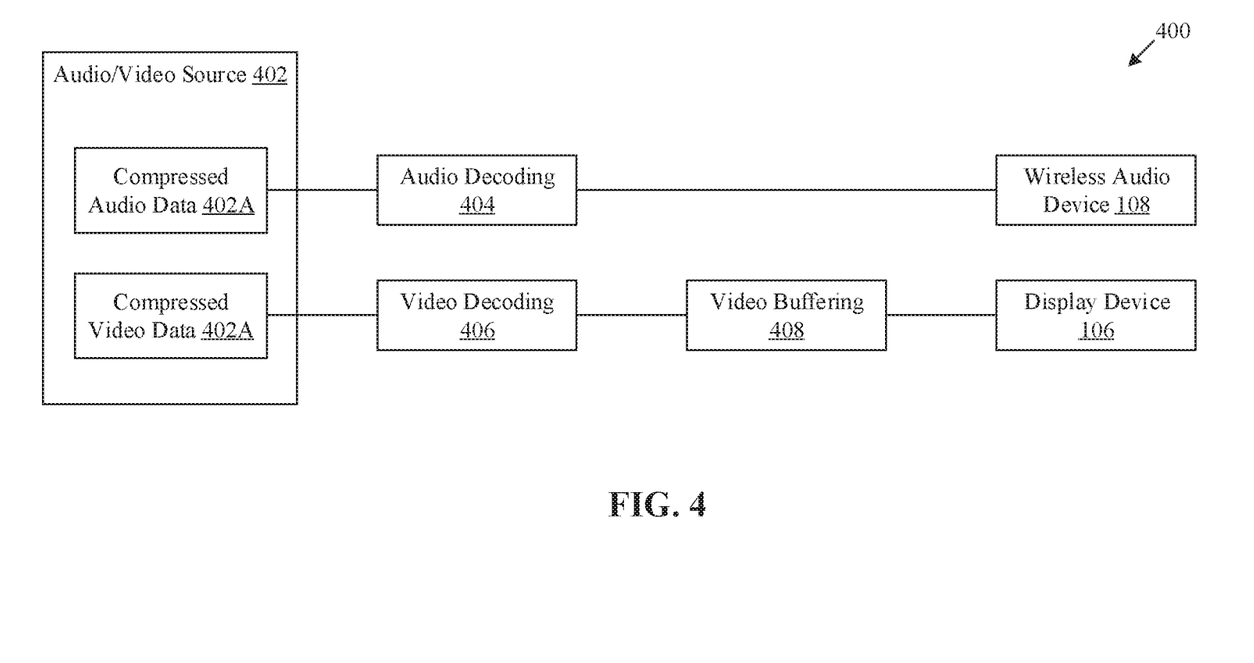
FIG. 4 is a diagram that illustrates exemplary operations for synchronization of wireless audio to video, in accordance with an embodiment of the disclosure.

FIG. 4 is a diagram that illustrates exemplary operations for synchronization of wireless audio to video, in accordance with an embodiment of the disclosure. FIG. 4 is explained in conjunction with elements from FIGS. 1, 2, and 3. With reference to FIG. 4, there is shown a block diagram 400 that illustrates exemplary operations from 404 to 408 for synchronization of wireless audio to video. The exemplary operations from 404 to 408 may be executed by any computing system, for example, by the electronic apparatus 102 of FIG. 1 or by the circuitry 202 of FIG. 2.

There is further shown an AV source 402 which may be coupled to the buffer memory 208 of FIG. 2. The AV source 402 is an exemplary implementation of the AV source 206 of FIG. 2 or the AV source 104 of FIG. 1. The description of the AV source 402 is omitted from the disclosure for the sake of brevity. The AV source 402 may store the compressed media which includes compressed audio data 402A and compressed video data 402B associated with the compressed audio data 402A.

At 404, the compressed audio data 402A may be decoded. In accordance with an embodiment, the circuitry 202 may decode the compressed audio data 402A to output uncompressed audio, which may be referred to as the audio content. The compressed audio data 402A may be decoded and converted to a suitable codec format supported by an audio codec for wireless audio transfer. Thereafter, the circuitry 202 may transmit the audio content to the wireless audio device 108, via the wireless network 110.

The decoding of the compressed audio data 402A, the conversion to the suitable codec format, and the wireless transmission of the audio content may incur a delay in the wireless audio processing pipeline of the electronic apparatus 102. The delay may equal (approximate) the determined first wireless audio processing delay (as described in FIG. 1) associated with the electronic apparatus 102. In order to avoid any lip synch error due to such delay in the wireless audio processing pipeline of the electronic apparatus 102, the compressed video data 402B may be first decoded and then stored in a buffer to delay the playback, as described at 406 and onwards.

At 406, the compressed video data 402B may be decoded. In accordance with an embodiment, the circuitry 202 may decode the compressed video data 402B to output uncompressed video, which may be referred to as the video content.

At 408, the video content may be stored in the buffer memory 208 after the compressed video data 402B is decoded. In accordance with an embodiment, the circuitry 202 may store the compressed video data 402B in the buffer memory 208 for a holding duration while the compressed audio data 402A is decoded, converted, and transmitted to the wireless audio device 108 (at 404).

The holding duration may refer to a time duration for which the compressed video data 402B may be stored in the buffer memory 208 to delay the playback of uncompressed video data (i.e. video content) on the display device 106 and to match a time of the playback of the transmitted audio content to the wireless audio device 108. The holding duration may include the determined first wireless audio processing delay and/or any delay associated with movement of the compressed video data 402B in and out of the buffer memory 208. In at least one embodiment, the holding duration may also include the second wireless audio processing delay (as described in FIG. 2) associated with the wireless audio device 108.

The circuitry 202 may extract the video content (i.e. the uncompressed video data) from the buffer memory 208 after the holding duration and may transfer the video content to the display device 106. Thereafter, the circuitry 202 may control the playback of the video content on the display device 106 and match the time of the playback of the audio content on the wireless audio device 108.

Figure 5:
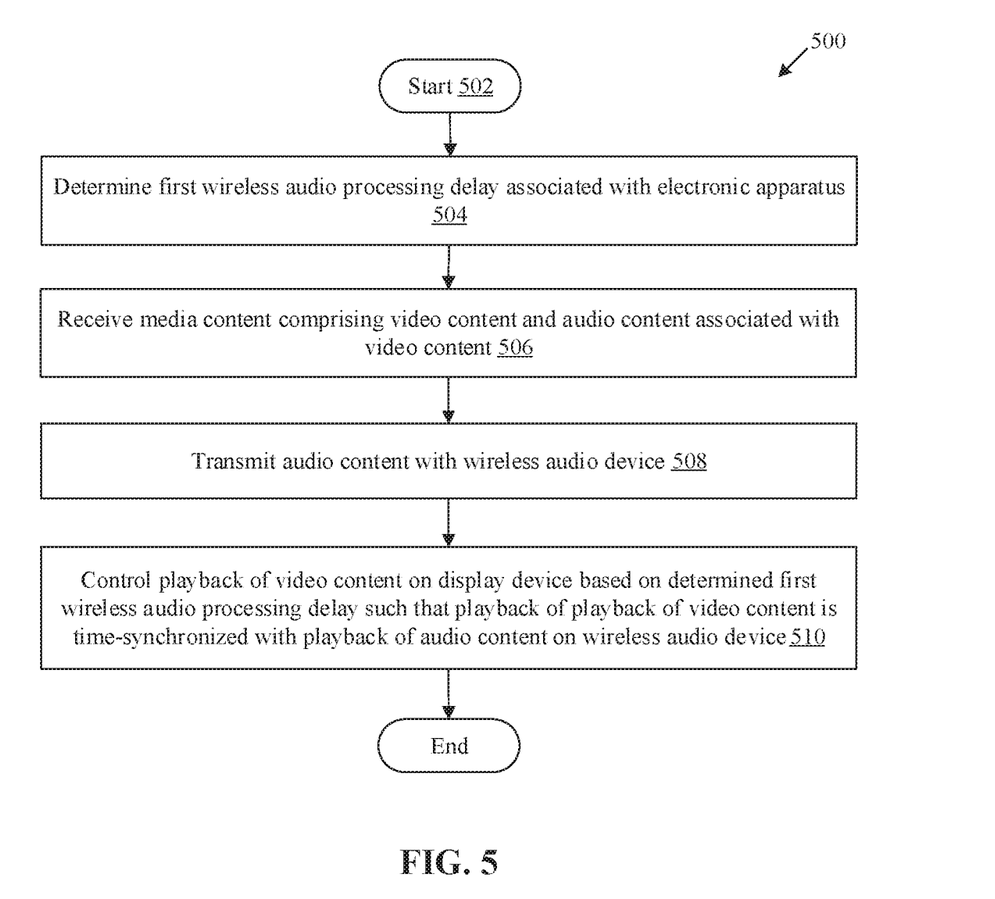
FIG. 5 is a flowchart that illustrates an exemplary method for synchronization of wireless audio to video, in accordance with an embodiment of the disclosure.

FIG. 5 is a flowchart that illustrates exemplary method for synchronization of wireless audio to video, in accordance with an embodiment of the disclosure. FIG. 5 is explained in conjunction with elements from FIGS. 1, 2, 3, and 4. With reference to FIG. 5, there is shown a flowchart 500. The method illustrated in the flowchart 500 may be executed by any computing system, such as by the electronic apparatus 102 or the circuitry 202. The method may start at 502 and proceed to 504.

At 504, a first wireless audio processing delay may be determined. In one or more embodiments, the circuitry 202 may be configured to determine the first wireless audio processing delay associated with the electronic apparatus 102.

At 506, the media content may be received. In one or more embodiments, the circuitry 202 may be configured to receive the media content which includes video content and audio content associated with the video content.

At 508, the audio content may be transmitted to the wireless audio device 108. In one or more embodiments, the circuitry may be configured to transmit the audio content to the wireless audio device 108.

At 510, a playback of the video content on the display device 106 may be controlled based on the determined first wireless audio processing delay. In one or more embodiments, the circuitry 202 may be configured to control the playback of the video content on the display device 106 based on the determined first wireless audio processing delay such that the playback of the video content is time-synchronized with playback of the audio content on the wireless audio device 108. Control may pass to end.

Although the flowchart 500 is illustrated as discrete operations, such as 504, 506, 508, and 510, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic apparatus. The instructions may cause the machine and/or computer to perform operations that include determining a first wireless audio processing delay associated with the electronic apparatus. The operations may further include receiving media content comprising video content and audio content associated with the video content. The operations may further include transmitting the audio content to a wireless audio device communicatively coupled to the electronic apparatus. The operations may further include controlling playback of the video content on a display device associated with the electronic apparatus based on the determined first wireless audio processing delay such that the playback of the video content is time-synchronized with playback of the audio content on the wireless audio device.

Exemplary aspects of the disclosure may provide an electronic apparatus (such as the electronic apparatus 102 of FIG. 1) that includes circuitry (such as the circuitry 202) that may be communicatively coupled to a display device (such as the display device 106) and a wireless audio device (such as the wireless audio device 108). The circuitry may be configured to determine a first wireless audio processing delay associated with the electronic apparatus. At any time, the circuitry may be further configured to receive media content comprising video content and audio content associated with the video content. The circuitry may be further configured to transmit the audio content to the wireless audio device and control playback of the video content on the display device based on the determined first wireless audio processing delay such that the playback of the video content is time-synchronized with playback of the audio content on the wireless audio device. In accordance with an embodiment, the playback of the video content is delayed by at least the determined first wireless audio processing delay to match a time of the playback of the audio content on the wireless audio device.

In accordance with an embodiment, the circuitry may be further configured to determine a Media Access Control (MAC) address of the wireless audio device and determine a second wireless audio processing delay associated with the wireless audio device based on the determined MAC address. In accordance with an embodiment, the circuitry may be further configured to control the playback of the video content on the display device further based on the determined second wireless audio processing delay.

In accordance with an embodiment, the electronic apparatus may further include a memory (such as the memory 204) configured to store a first delay profile for the electronic apparatus. The first delay profile comprises the first wireless audio processing delay associated with the electronic apparatus. In accordance with an embodiment, the circuitry may be further configured to determine the first wireless audio processing delay based on the first delay profile.

In accordance with an embodiment, the electronic apparatus may further include an Audio/Video (AV) source (such as the AV source 206) configured to output compressed media comprising compressed audio data (such as the compressed audio data 302A) and compressed video data (such as the compressed video data 302B).

In accordance with an embodiment, the electronic apparatus may further include a buffer memory (such as the buffer memory 208) coupled to the AV source. The circuitry may be configured to store the compressed video data in the buffer memory for a holding duration that includes the determined first wireless audio processing delay while the compressed audio data is decoded as the audio content and transmitted to the wireless audio device. The circuitry may be further configured to extract the compressed video data from the buffer memory after the holding duration. After the extraction, the circuitry may be further configured to decode the compressed video data as the video content. Thereafter, the circuitry may be configured to control the playback of the video content on the display device to match with a timing of the playback of the audio content on the wireless audio device.

In accordance with an embodiment, the electronic apparatus may further include a buffer memory (such as the buffer memory 208) coupled to the AV source. The circuitry may be configured to decode the compressed video data to obtain the video content. After the decode, the circuitry may be configured to store the video content in the buffer memory for a holding duration that includes the determined first wireless audio processing delay while the compressed audio data is decoded as the audio content and transmitted to the wireless audio device. The circuitry may be further configured to extract the stored video data from the buffer memory after the holding duration. Thereafter, the circuitry may be configured to control the playback of the video content on the display device to match with a timing of the playback of the transmitted audio content on the wireless audio device.

In accordance with an embodiment, the circuitry may be further configured to control the display device to display a test video. The circuitry may be further configured to transmit a test audio associated with the test video to the wireless audio device 108. The circuitry may be further configured to receive, via the wireless audio device, a user (such as the user 112) input comprising a duration by which the playback of the test video is to be delayed to match a time of the playback of the transmitted test audio to the wireless audio device. Thereafter, the circuitry may be configured to set the first wireless audio processing delay as the duration included in the user input.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
   circuitry communicatively coupled to a display device and a wireless audio device, wherein the circuitry is configured to:
      determine a first wireless audio processing delay associated with the electronic apparatus;
      determine a Media Access Control (MAC) address of the wireless audio device;
      determine, based on the determined MAC address, a second wireless audio processing delay associated with the wireless audio device;
      receive media content comprising video content and audio content associated with the video content;
      transmit the audio content to the wireless audio device; and
      control playback of the video content on the display device based on the determined first wireless audio processing delay and the determined second wireless audio processing delay such that the playback of the video content is time-synchronized with playback of the audio content on the wireless audio device.

2. The electronic apparatus according to claim 1, wherein the playback of the video content is delayed by at least the determined first wireless audio processing delay to match a time of the playback of the audio content on the wireless audio device.

3. The electronic apparatus according to claim 1, further comprising a memory configured to store a delay profile for the electronic apparatus, wherein the delay profile comprises the first wireless audio processing delay of the electronic apparatus.

4. The electronic apparatus according to claim 3, wherein the circuitry is further configured to determine the first wireless audio processing delay based on the delay profile.

5. The electronic apparatus according to claim 1, further comprising an Audio/Video (AV) source configured to output compressed media comprising compressed audio data and compressed video data.

6. The electronic apparatus according to claim 5, further comprising a buffer memory coupled to the AV source, wherein the circuitry is further configured to:
   store the compressed video data in the buffer memory for a holding duration that includes the determined first wireless audio processing delay while the compressed audio data is decoded as the audio content and transmitted to the wireless audio device;
   extract the compressed video data from the buffer memory after the holding duration;
   after the extraction, decode the compressed video data as the video content; and
   control the playback of the video content on the display device to match with a timing of the playback of the audio content on the wireless audio device.

7. The electronic apparatus according to claim 5, further comprising a buffer memory coupled to the AV source, wherein the circuitry is further configured to:
   decode the compressed video data to obtain the video content;
   after the decode, store the video content in the buffer memory for a holding duration that includes the determined first wireless audio processing delay while the compressed audio data is decoded as the audio content and transmitted to the wireless audio device;
   extract the stored video content from the buffer memory after the holding duration; and
   control the playback of the video content on the display device to match with a timing of the playback of the transmitted audio content on the wireless audio device.

8. The electronic apparatus according to claim 1, wherein the circuitry is further configured to:
   control the display device to display a test video;
   transmit a test audio associated with the test video to the wireless audio device;
   receive, via the wireless audio device, a user input comprising a duration by which playback of the test video is to be delayed to match a time of playback of the transmitted test audio on the wireless audio device; and
   set the first wireless audio processing delay as the duration included in the user input.

9. A method, comprising:
   in an electronic apparatus communicatively coupled to a wireless audio device and a display device:
      determining a first wireless audio processing delay associated with the electronic apparatus;
      determining a Media Access Control (MAC) address of the wireless audio device;
      determining, based on the determined MAC address, a second wireless audio processing delay associated with the wireless audio device;
      receiving media content comprising video content and audio content associated with the video content;
      transmitting the audio content to the wireless audio device; and
      controlling playback of the video content on the display device based on the determined first wireless audio processing delay and the determined second wireless audio processing delay such that the playback of the video content is time-synchronized with playback of the audio content on the wireless audio device.

10. The method according to claim 9, wherein the control of the playback of the video content corresponds to a delay in the playback of the video content by at least the determined first wireless audio processing delay to match a time of the playback of the audio content on the wireless audio device.

11. The method according to claim 9, further comprising determining the first wireless audio processing delay based on a first delay profile for the electronic apparatus, wherein the first delay profile comprises the first wireless audio processing delay.

12. The method according to claim 9, further comprising outputting, via an Audio/Video (AV) source of the electronic apparatus, compressed media comprising compressed audio data and compressed video data.

13. The method according to claim 12, further comprising:
storing the compressed video data in a buffer memory of the electronic apparatus for a holding duration that includes the determined first wireless audio processing delay while the compressed audio data is decoded as the audio content and transmitted to the wireless audio device;
extracting the compressed video data from the buffer memory after the holding duration;
after the extraction, decoding the compressed video data as the video content; and
controlling the playback of the video content on the display device to match with a timing of the playback of the audio content on the wireless audio device.

14. The method according to claim 12, further comprising:
decoding the compressed video data to obtain the video content;
after the decoding, storing the video content in a buffer memory of the electronic apparatus for a holding duration that includes the determined first wireless audio processing delay while the compressed audio data is decoded as the audio content and transmitted to the wireless audio device;
extracting the stored video content from the buffer memory after the holding duration; and
controlling the playback of the video content on the display device to match with a timing of the playback of the transmitted audio content on the wireless audio device.

15. The method according to claim 9, further comprising:
controlling the display device to display a test video;
transmitting a test audio associated with the test video to the wireless audio device;
receiving, via the wireless audio device, a user input comprising a duration by which playback of the test video is to be delayed for matching a time of playback of the transmitted test audio on the wireless audio device; and
setting the first wireless audio processing delay as the duration included in the user input.

16. A non-transitory computer-readable medium having stored thereon, computer-executable instructions which, when executed by a computer in an electronic apparatus, cause the computer to execute operations, the operations comprising:
determining a first wireless audio processing delay associated with the electronic apparatus;
determining a Media Access Control (MAC) address of a wireless audio device communicatively coupled to the electronic apparatus;
determining, based on the determined MAC address, a second wireless audio processing delay associated with the wireless audio device;
receiving media content comprising video content and audio content associated with the video content;
transmitting the audio content to the wireless audio device; and
controlling playback of the video content on a display device associated with the electronic apparatus based on the determined first wireless audio processing delay and the determined second wireless audio processing delay such that the playback of the video content is time-synchronized with playback of the audio content on the wireless audio device.

17. An electronic apparatus, comprising:
an Audio/Video (AV) source configured to output compressed media comprising compressed audio data and compressed video data;
a buffer memory coupled to the AV source; and
circuitry communicatively coupled to a display device and a wireless audio device, wherein the circuitry is configured to:
determine a first wireless audio processing delay associated with the electronic apparatus;
decode the compressed audio data as audio content;
transmit the audio content to the wireless audio device;
store the compressed video data in the buffer memory for a holding duration that includes the determined first wireless audio processing delay while the compressed audio data is decoded as the audio content and transmitted to the wireless audio device;
extract the compressed video data from the buffer memory after the holding duration;
after the extraction, decode the compressed video data as video content; and
control playback of the video content on the display device to match with a timing of playback of the audio content on the wireless audio device.

\* \* \* \* \*